(12) United States Patent
Usuda et al.

(10) Patent No.: US 8,140,080 B2
(45) Date of Patent: Mar. 20, 2012

(54) TRANSMISSION RATE CONTROL METHOD, AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1062 days.

(21) Appl. No.: 11/508,984

(22) Filed: Aug. 24, 2006

(65) Prior Publication Data

US 2007/0049209 A1    Mar. 1, 2007

(30) Foreign Application Priority Data

Aug. 24, 2005   (JP) .............. P2005-274651

(51) Int. Cl.
*H04W 36/00* (2009.01)
(52) U.S. Cl. ................. 455/442; 455/436; 370/331
(58) Field of Classification Search .......... 455/436–444, 455/69, 522; 370/318, 331–334
See application file for complete search history.

(56) References Cited

U.S. PATENT DOCUMENTS

| | | | | |
|---|---|---|---|---|
| 2004/0147286 A1* | 7/2004 | Kim et al. | ..................... | 455/560 |
| 2006/0172739 A1* | 8/2006 | Wigard et al. | ................ | 455/442 |
| 2010/0227615 A1* | 9/2010 | Gaal et al. | ..................... | 455/436 |

FOREIGN PATENT DOCUMENTS

| | | |
|---|---|---|
| CN | 1301470 A | 6/2001 |
| JP | 2004-266812 A | 9/2004 |
| WO | WO 99/09779 | 2/1999 |
| WO | WO99/09779 A1 | 2/1999 |
| WO | 2004075473 A1 | 9/2004 |
| WO | WO 2005/018270 A2 | 2/2005 |

OTHER PUBLICATIONS

3GPP TSG-RAN WG2#47 meeting, May 9-13, 2005, Athens, Greece.*
3GPP TSG-RAN 2#47 meeting R2-051342; May 9-13, 2005; Athen, Greece; Source: Panasonic; Title: E-AGCH signalling format; Agenda Item: 12.2.
3GPP TSG-RAN 2#47 meeting R2-051396; May 9-13, 2005; Athen, Greece; Source: Panasonic; Title: E-AGCH signalling format; Agenda Item: 12.2.

* cited by examiner

Primary Examiner — Raymond Dean
(74) Attorney, Agent, or Firm — Marvin A. Motsenbocker; Mots Law, PLLC

(57) ABSTRACT

A transmission rate control method for controlling a transmission rate of uplink user data to be transmitted by a mobile station, includes: determining, at the radio network controller, that the mobile station is shifted between a soft-handover state in which the mobile station establishes radio links with a plurality of cells and a non soft-handover state in which the mobile station establishes a radio link with only one cell; allocating, at the radio network controller, a first temporary identifier or a second temporary identifier as a common identifier for a common transmission rate control to the mobile station based on the determination of shifts; and controlling, at a cell which establishes a radio link with the mobile station, the transmission rate of the uplink user data of the mobile station using the first temporary identifier or the second temporary identifier.

3 Claims, 13 Drawing Sheets

TRANSMISSION RATE CONTROL METHOD, AND RADIO NETWORK CONTROLLER

CROSS REFERENCE TO RELATED APPLICATION

This application is based upon and claims the benefit of priority from the prior Japanese Patent Application No. P2005-274651, filed on Aug. 24, 2005; the entire contents of which are incorporated herein by reference.

BACKGROUND OF THE INVENTION

1. Field of the Invention

The present invention relates to a transmission rate control method for controlling a transmission rate of uplink user data transmitted by a mobile station, and a radio network controller.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Referring to FIG. 3, the mobile communication system, to which the "Enhanced Uplink" is applied, is explained.

In step S2001, the mobile station UE is establishing a data connection (E-DPDCH) for transmitting the uplink user data with the radio network controller RNC via the cell #10.

In step S2002, when the reception power of a common pilot channel from the cell #20 become more than or equal to the predetermined value, the mobile station UE transmits measurement report to the radio network controller RNC.

In step S2003, the radio network controller RNC requests the cell #20 to establish synchronization of radio links for uplink between the mobile station UE and the cell #20, based on the transmitted measurement report.

To be more specific, the radio network controller RNC transmits, to the cell #20, a SHO setting request including SHO parameters. The SHO parameters includes a channelization code for identifying a channel configuration in the radio links for uplink, a scrambling code for identifying the mobile station UE, and a start time of the SHO.

In step S2004, the cell #20 transmits a SHO setting response for indicating that the cell #20 has received the SHO setting request.

In step S2005, the radio network controller RNC requests the mobile station UE to establish synchronization of radio links for downlink between the cell #20 and the mobile station UE.

To be more specific, the radio network controller RNC transmits, to the mobile station UE, a SHO setting request including the SHO parameters. The SHO parameters includes a channelization code for identifying a channel configuration in the radio links for downlink, a scrambling code for identifying the cell #20, and a start time of the SHO.

In step S2006, the mobile station UE transmits a SHO setting response for indicating that the mobile station UE has received the SHO setting request. The mobile station UE shifts from the Non-SHO state to the SHO state based on the SHO parameters. In step S2007, the mobile station becomes in the SHO state with the cell #10 and the cell #20.

Based on the above steps, the mobile station UE in the EUL is configured to connect to a plurality of cells simultaneously in the SHO state, so as to prevent the interruption of communication.

Here, with regard to a certain mobile station UE, a set of radio links established between the mobile station UE and the cell controlled by the radio base station Node B will be called as an "active set".

The active set will be updated, for example, when the mobile station UE shifts between the Non-SHO state and the SHO state, or when the cells to which the mobile station UE establishes radio links are changed.

Generally, when the effects of interference to neighboring cells are considered, it is preferable to control the transmission rate of uplink user data of the mobile station UE, between during the SHO state and during the Non-SHO state, differently.

However, in the conventional mobile communication system to which the "Enhanced Uplink" is applied, the radio base station Node B, which controls each cell, cannot identify whether the mobile station UE establishing the radio links with each cell is during the SHO state or during the Non-SHO state.

Accordingly, there has been a problem that, in the conventional mobile communication system to which the EUL is applied, it is not possible to perform the transmission rate control of the uplink user data, based on whether the mobile station UE is during the SHO state or during the Non-SHO state.

BRIEF SUMMARY OF THE INVENTION

The present invention has been made considering the problems, and its object is to provide a transmission rate control method which can increase radio uplink efficiency in whole cells by controlling a transmission rate of uplink user data of a mobile station UE during a soft-handover state, and a transmission rate of uplink user data of a mobile station UE during a non soft-handover state, differently, in a mobile communication system to which an "Enhanced Uplink" is applied, and a radio network controller RNC.

A first aspect of the present invention is summarized as a transmission rate control method for controlling a transmission rate of uplink user data to be transmitted by a mobile station, including: determining, at the radio network controller, that the mobile station is shifted between a soft-handover state in which the mobile station establishes radio links with a plurality of cells and a non soft-handover state in which the mobile station establishes a radio link with only one cell; allocating, at the radio network controller, a first temporary identifier or a second temporary identifier as a common identifier for a common transmission rate control to the mobile station based on the determination of shifts; and controlling, at a cell which establishes a radio link with the mobile station, the transmission rate of the uplink user data of the mobile station using the first temporary identifier or the second temporary identifier.

In the first aspect, a radio network controller can manage a first temporary identifier to be allocated to the mobile station during the soft-handover state, and a second temporary identifier to be allocated to the mobile station during the non soft-handover state.

A second aspect of the present invention is summarized as a radio network controller used in a mobile communication system for controlling a transmission rate of uplink user data transmitted by a mobile station, including: a temporary identifier manager configured to manage a first temporary identifier and a second temporary identifier; a shift determiner configured to determine that the mobile station is shifted between a soft-handover state in which the mobile station establishes radio links with a plurality of cells and a non soft-handover state in which the mobile station establishes a radio link with only one cell; and a temporary identifier allocator configured to allocate the first temporary identifier or the second temporary identifier as a common identifier for a common transmission rate control to the mobile station, based on the determination of shifts.

In the second aspect, the temporary identifier manager can configured to manage the first temporary identifier to be allocated to the mobile station during the soft-handover state, and the second temporary identifier to be allocated to the mobile station during the non soft-handover state.

DETAILED DESCRIPTION OF THE INVENTION (Configuration of Mobile Communication System According to First Embodiment of the Present Invention)

Referring to FIGS. 4 to 16, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 1:
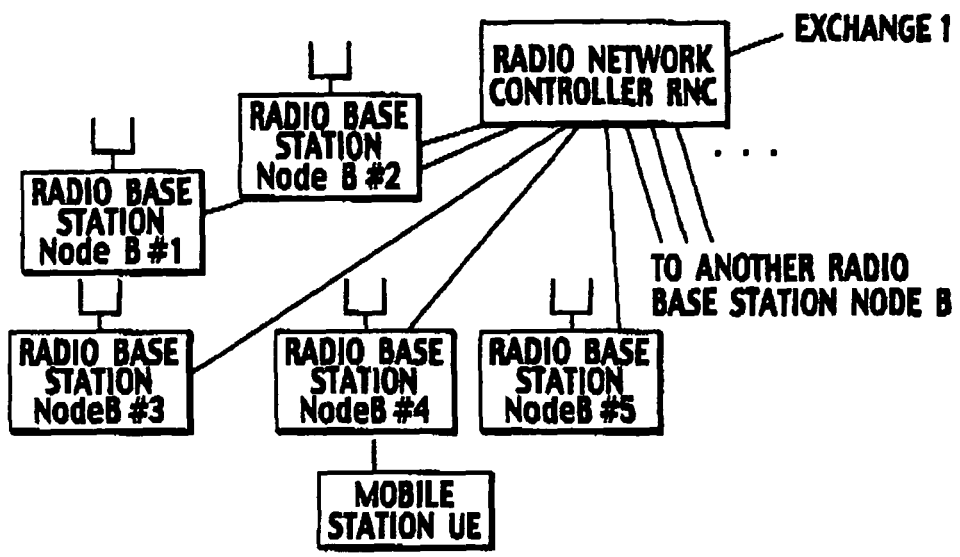
FIG. 1 is diagram of an entire configuration of a general mobile communication system.
Figure 2A:
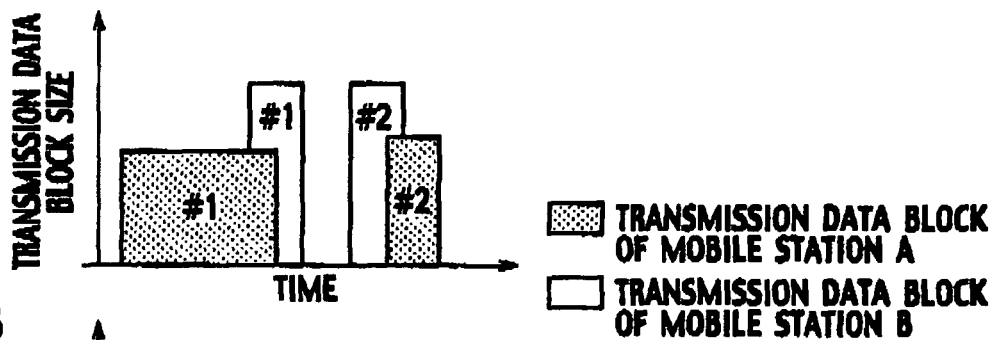
FIGS. 2A to 2C are diagrams for explaining a method for controlling a transmission rate of uplink used data in a conventional mobile communication system.
Figure 2B:
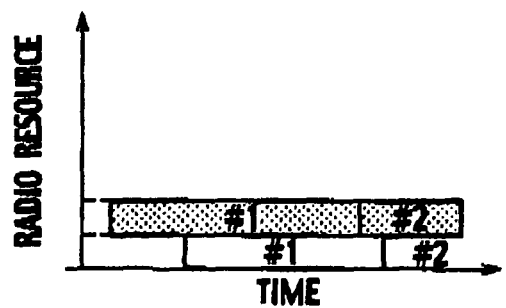
Figure 2C:
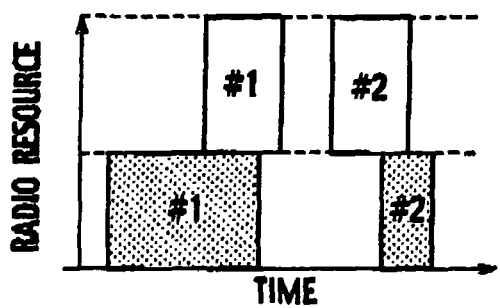
Figure 3:
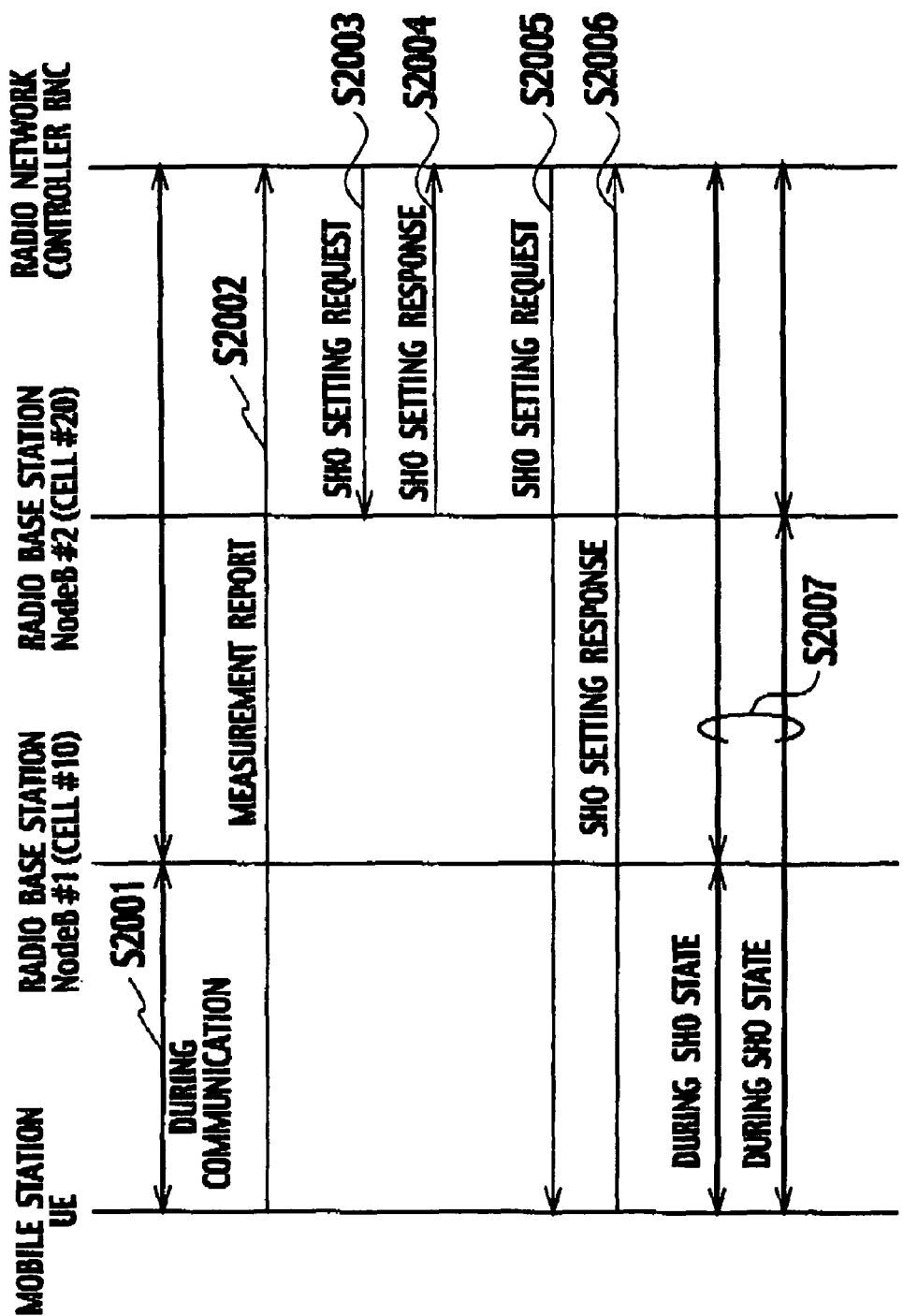
FIG. 3 is a diagram for explaining the transmission rate control method in the conventional mobile communication system.
Figure 4:
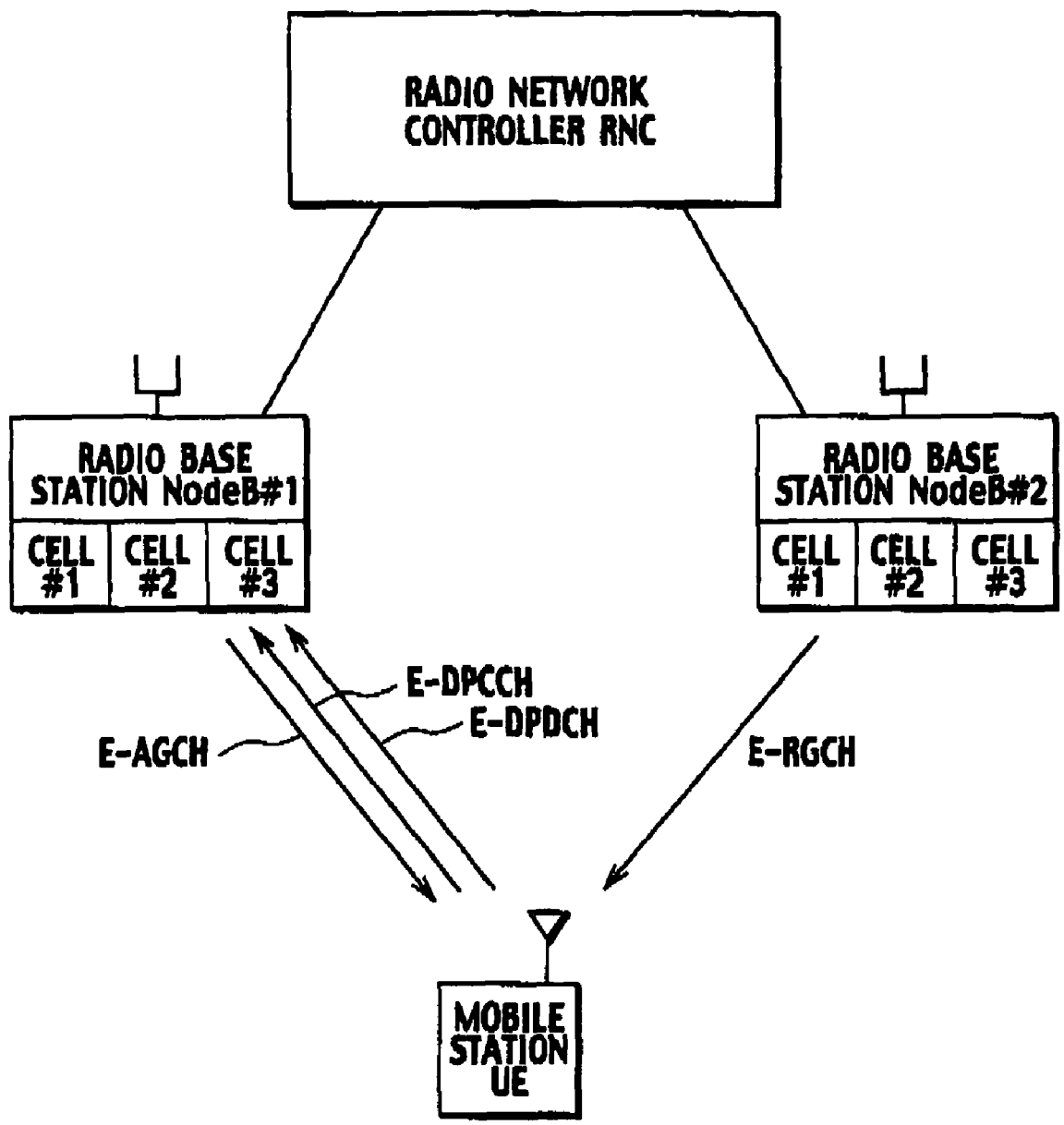
FIG. 4 is a diagram of an entire configuration of mobile communication system according to a first embodiment of the present invention.

In the example of FIG. 4, the cell #3 which is controlled by the radio base station Node B #1 is a serving cell for the mobile station UE, which mainly controls the transmission rate of uplink user data transmitted from the mobile station UE.

The cell #1 which is controlled by the radio base station Node B #2 is a non-serving cell for the mobile station UE, which establishes a radio link with the mobile station UE and is not the serving cell.

Here, in the above case, the cell #3 (the serving cell for the mobile station UE) is configured to transmit an "Enhanced Absolute Grant Channel (E-AGCH)" to the mobile station UE, and the mobile station UE is configured to transmit an "Enhanced Dedicated Physical Control Channel (E-DPCCH)" and an "Enhanced Dedicated Physical Data Channel (E-DPDCH)" to the cell #3 (the serving cell for the mobile station UE).

Further, in the above case, the cell #1 (the non-serving cell for the mobile station UE) is configured to transmit an "Enhanced Relative Grant Channel (E-RGCH)" to the mobile station UE.

Figure 5:
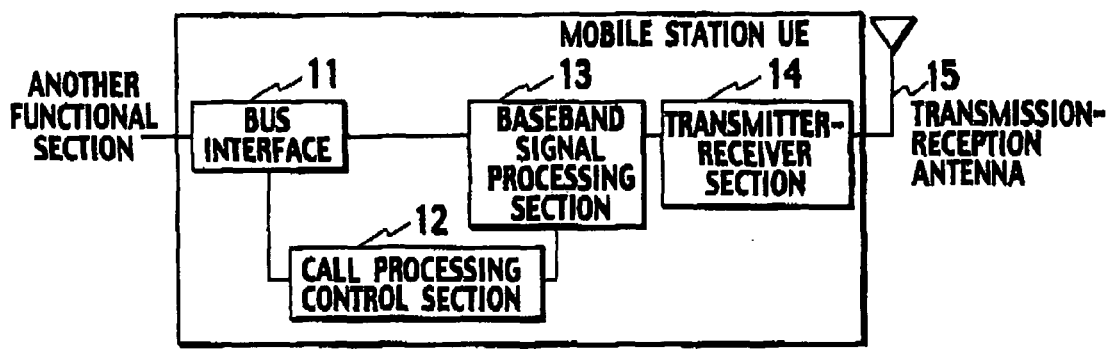
FIG. 5 is a functional block diagram of a mobile station in the mobile communication system according to the first embodiment of the present invention.

An example of general configuration of a mobile station UE according to this embodiment is shown in FIG. 5.

As shown in FIG. 5, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 5).

However, these functions do not have to be independently present as hardware. That is, these functions can be partly or entirely integrated, or can be configured through a process of software.

Figure 6:
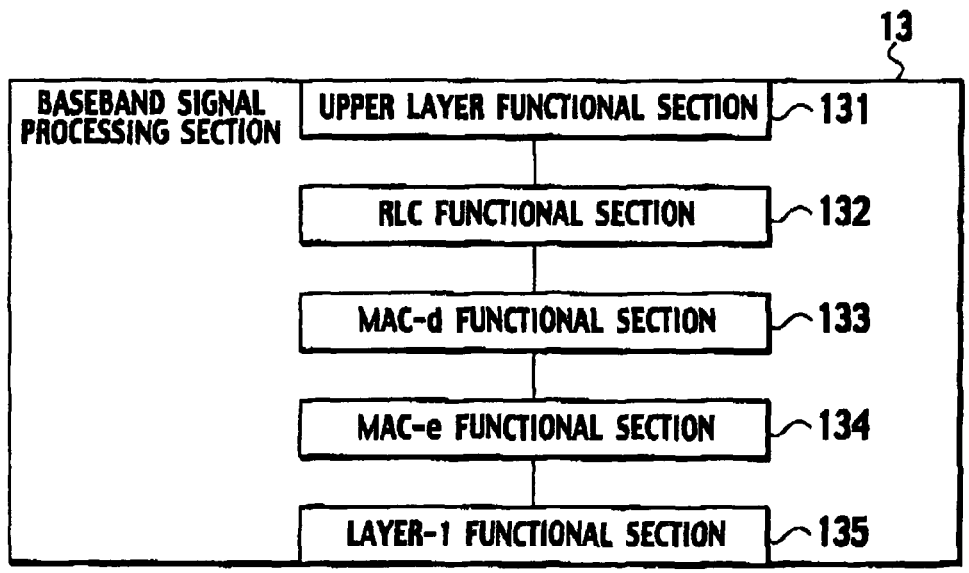
FIG. 6 is a functional block diagram of a baseband signal processing section of the mobile station in the mobile communication system according to the first embodiment of the present invention.

In FIG. 6, a functional block of the baseband signal processing section 13 is shown.

As shown in FIG. 6, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 7:
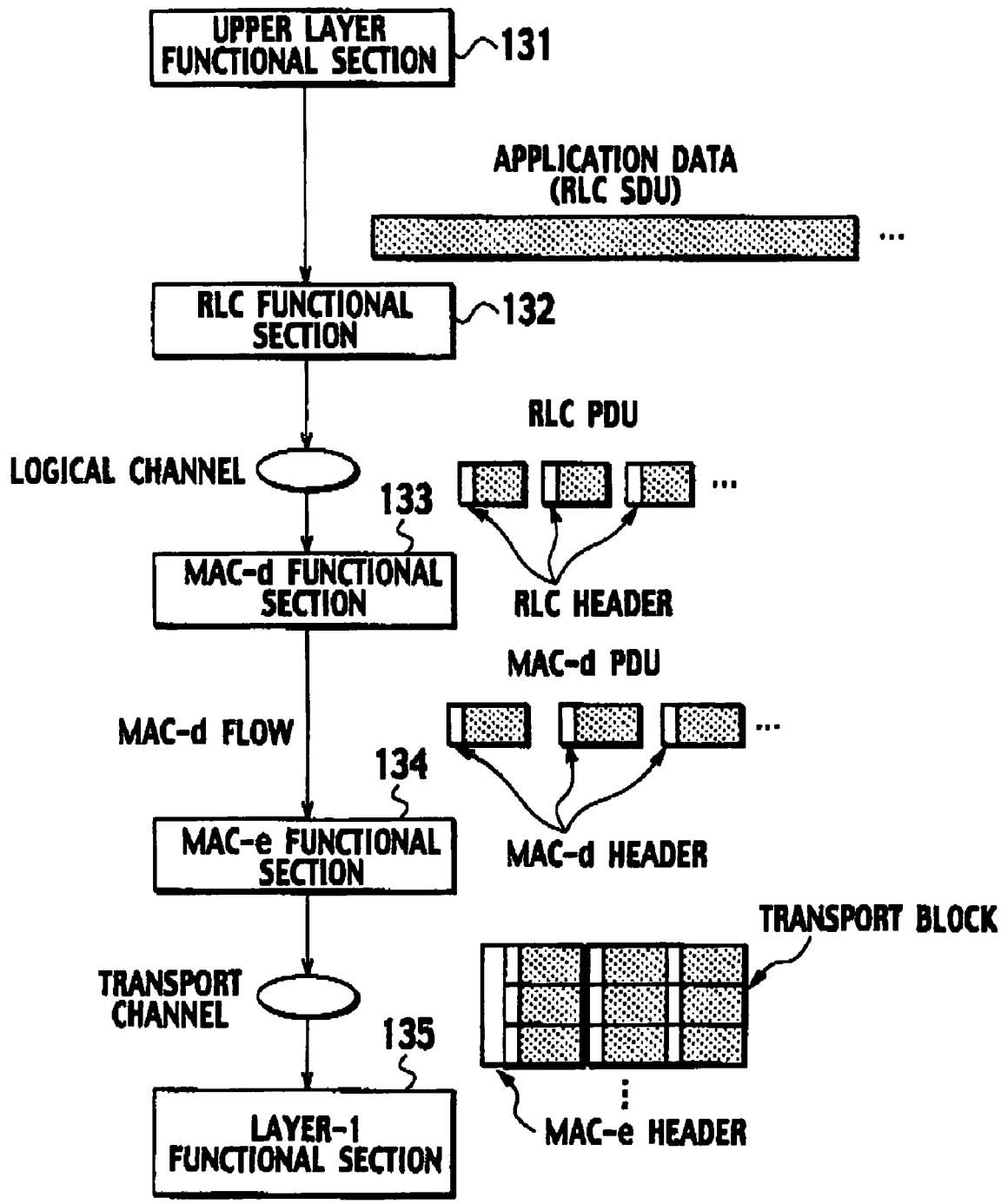
FIG. 7 is a diagram for explaining functions of the baseband signal processing section of the mobile station in the mobile communication system according to the first embodiment of the present invention.

As shown in FIG. 7, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 8:
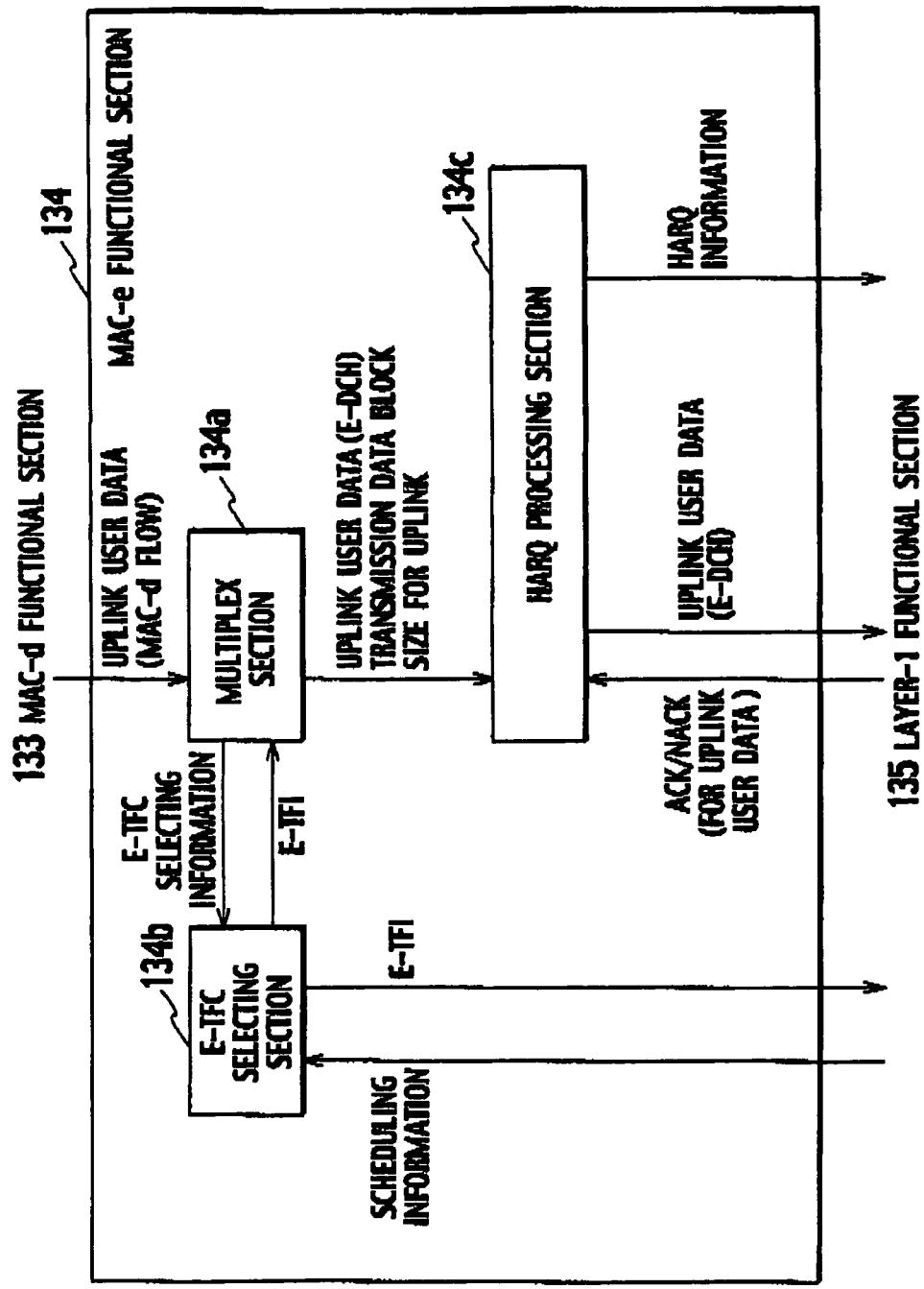
FIG. 8 is a functional block diagram of a MAC-e functional section in the baseband signal processing section of the mobile station in the mobile communication system according to the first embodiment of the present invention.

Specifically, as shown in FIG. 8, the MAC-e functional section 134 is provided with a multiplex section 134a, an E-TFC selecting section 134b, and an HARQ processing section 134c.

The multiplex section 134a is configured to perform a multiplex processing to the uplink user data, which is received from the MAC-d functional section 133 as MAC-d flow, based on a "Enhanced-Transport Format Indicator (E-TFI)" notified from the E-TFC selecting section 134b, so as to generate uplink user data (a Transport Block) to be transmitted via a transport channel (E-DCH). Then, the multiplex section 134a is configured to transmit the generated uplink user data (Transport Block) to the HARQ processing section 134c.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134a is configured to determine a transmission data block size to be applied for the uplink user data based on the E-TFI notified from the E-TFC selecting section 134b, and to notify the determined transmission data block size to the HARQ processing section 134c.

In addition, when the multiplex section 134a receives the uplink user data from the MAC-d functional section 133 as MAC-d flow, the multiplex section 134a is configured to notify, to the E-TFC selecting section 134b, E-TFC selecting information for selecting a transport format for the received uplink user data.

Here, the E-TFC selecting information includes data size and priority class of the uplink user data, or the like.

The HARQ processing section 134c is configured to perform the retransmission control processing for the "uplink user data (E-DCH)" according to the "N channel stop and wait (N-SAW) protocol", based on ACK/NACK for the uplink user data notified from the layer-1 functional section 135.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134b is configured to select the transport format (E-TF) to be applied to transmission of the uplink user data, and to notify the E-TFI for identifying the selected transport format to the layer-1 functional section 135 and the multiplex section 134a.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

In addition, the E-TFC selecting section 134b is configured to transmit the uplink user data using an absolute transmission rate which was included in the E-AGCH associated with the temporary identifier (a common identifier) which is allocated by the radio network controller RNC to the mobile station UE.

Such temporary identifier includes a first temporary identifier and a second temporary identifier. Further, such temporary identifier is used as the common identifier in the common transmission rate control.

The first temporary identifier can be allocated to the mobile station UE during the SHO state, and the second temporary identifier can be allocated to the mobile station UE during the Non-SHO state.

Here, when the E-TFC selecting section 134b receives the absolute transmission rate of the uplink user data from the serving cell for the mobile station UE via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (Down command or Don't care command) from the non-serving cell for the mobile station UE via the E-RGCH as the scheduling information, the E-TFC selecting section 134b is configured to increase/decrease the transmission rate of the uplink user data, at the timing of receiving the relative transmission rate, by the predetermined rate based on the relative transmission rate of the uplink user data.

In addition, when the mobile station UE performs a dedicated transmission rate control, the E-TFC selecting section 134b is configured to control the transmission rate of uplink user data, based on a dedicated absolute transmission rate which is received from the serving cell via a Dedicated E-AGCH.

On the other hand, when the mobile station UE performs the common transmission rate control, the E-TFC selecting section 134b is configured to control the transmission rate of uplink user data, based on the common absolute transmission rate which is received from the serving cell via a Common E-AGCH.

Here, the Dedicated E-AGCH is configured to be transmitted using the dedicated identifier for the mobile station UE.

The Common E-AGCH is configured to be transmitted using the common identifier for the mobile stations UE which satisfy the predetermined condition (for example, the mobile stations UE during the SHO state, or the mobile station UE during the Non-SHO state).

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 9:
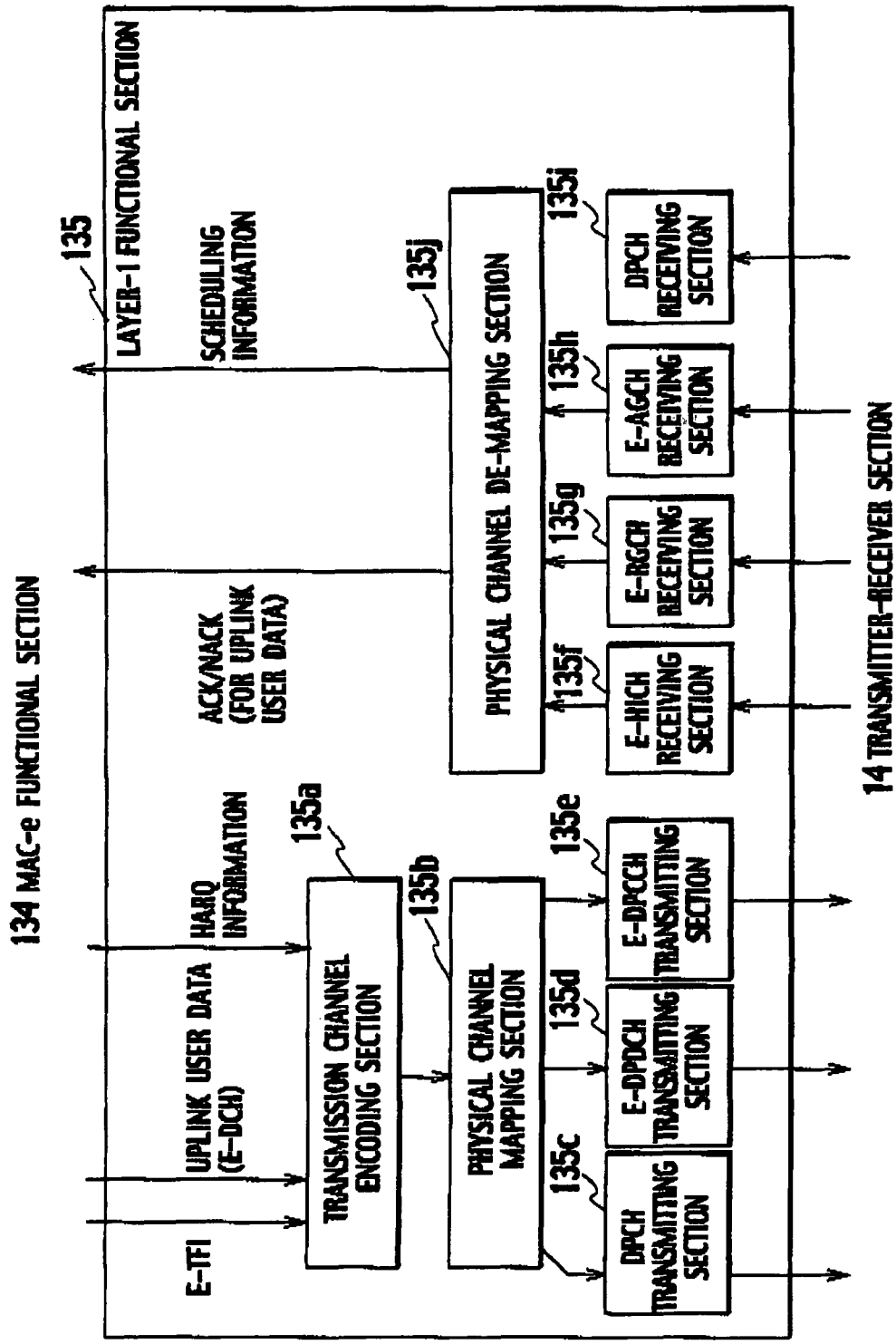
FIG. 9 is a functional block diagram of a layer-1 functional section in the baseband signal processing section of the mobile station in the mobile communication system according to the first embodiment of the present invention.

As shown in FIG. 9, the layer-1 functional section 135 is provided with a transmission channel encoding section 135a, a physical channel mapping section 135b, a DPCH transmitting section 135c, an E-DPDCH transmitting section 135d, an E-DPCCH transmitting section 135e, an E-HICH receiving section 135f, an E-RGCH receiving section 135g, an E-AGCH receiving section 135h, a physical channel de-mapping section 135j, and a DPCH receiving section 135i.

Figure 10:
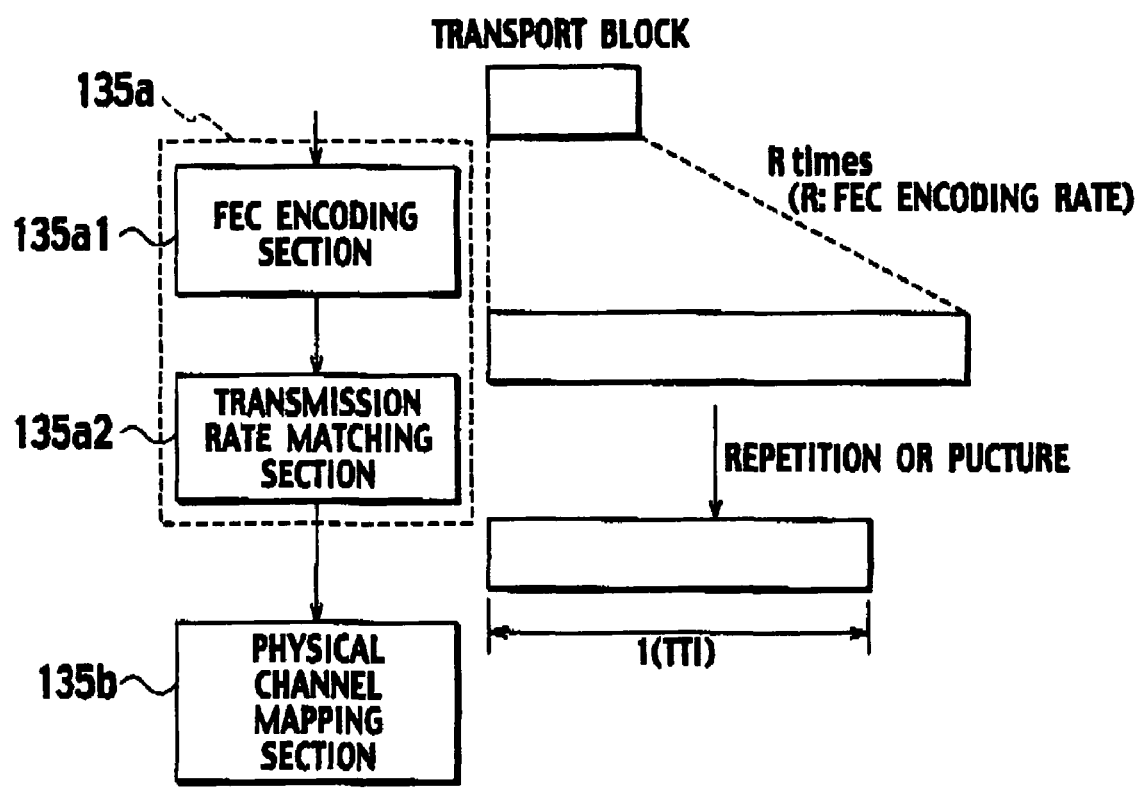
FIG. 10 is a diagram for explaining functions of the layer-1 functional section in the baseband signal processing section of the mobile station in the mobile communication system according to the first embodiment of the present invention.

As shown in FIG. 10, the transmission channel encoding section 135a is provided with a FEC (Forward Error Correction) encoding section 135a1, and a transmission rate matching section 135a2.

As shown in FIG. 10, the FEC encoding section 135a1 is configured to perform the error correction encoding processing toward the "uplink user data (E-DCH)", that is, the transport block, transmitted from the MAC-e functional section 134.

In addition, as shown in FIG. 10, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, and to pair the E-TFI and the HARQ information from the transmission channel encoding section 135a with the E-DPCCH.

The DPCH transmitting section 135c is configured to perform a transmission processing of a "Dedicated Physical Data Channel (DPDCH)" for uplink user data and a "Dedicated Physical Control Channel (DPCCH)" for uplink.

The E-DPDCH transmitting section 135d is configured to perform a transmission processing of the E-DPDCH.

The E-DPCCH transmitting section 135e is configured to perform a transmission processing of the E-DPCCH.

The E-HICH receiving section 135f is configured to receive an "E-DCH HARQ Acknowledgement Indicator Channel (E-HICH)" transmitted from the radio base station Node B (the serving cell and the non-serving cell for the mobile station UE).

The E-RGCH receiving section 135g is configured to receive the E-RGCH transmitted from the radio base station Node B (the serving cell and the non-serving cell for the mobile station UE).

The E-AGCH receiving section 135h is configured to receive the E-AGCH transmitted from the radio base station Node B (the serving cell for the mobile station UE).

More specifically, the E-AGCH receiving section 135h is configured to receive the Dedicated E-AGCH, which is transmitted using the dedicated identifier for the mobile station UE, and the Common E-AGCH, which is transmitted using the common identifier (the first temporary identifier or the second temporary identifier) for the mobile stations UE which satisfy the predetermined condition.

The DPCH receiving section 135i is configured to perform a receive processing of a downlink "Dedicated Physical Channel (DPCH)" transmitted from the radio base station Node B.

Here, the DPCH includes a "Dedicated Physical Data Channel (DPDCH)" and a "Dedicated Physical Control Channel (DPCCH)".

The physical channel de-mapping section 135j is configured to extract the ACK/NACK for the uplink user data which are included in the E-HICH received by the E-HICH receiving section 135f, so as to transmit the extracted ACK/NACK to the MAC-e functional section 134.

In addition, the physical channel de-mapping section 135j is configured to extract the scheduling information (the relative transmission rate of the uplink user data, that is, Up command/Down command/Don't care command) which is included in the E-RGCH received by the E-RGCH receiving section 135g, so as to transmit the extracted scheduling information to the MAC-e functional section 134.

In addition, the physical channel de-mapping section 135j is configured to extract the scheduling information (the absolute transmission rate of the uplink user data) which is included in the E-AGCH received by the E-AGCH receiving section 135h, so as to transmit the extracted scheduling information to the MAC-e functional section 134.

To be more specific, the physical channel de-mapping section 135j is configured to extract the dedicated absolute transmission rate which is included in the Dedicated E-AGCH received by the E-AGCH receiving section 135h, so as to transmit the extracted dedicated absolute transmission rate to the MAC-e functional section 134.

In addition, the physical channel de-mapping section 135j is configured to extract the common absolute transmission rate which is included in the Common E-AGCH received by the E-AGCH receiving section 135h, so as to transmit the extracted common absolute transmission rate to the MAC-e functional section 134.

In addition, the physical channel de-mapping section 135j is configured to extract the temporary identifier which is included in the DPDCH received by the DPCH receiving section 135i, so as to transmit the extracted temporary identifier.

Figure 11:
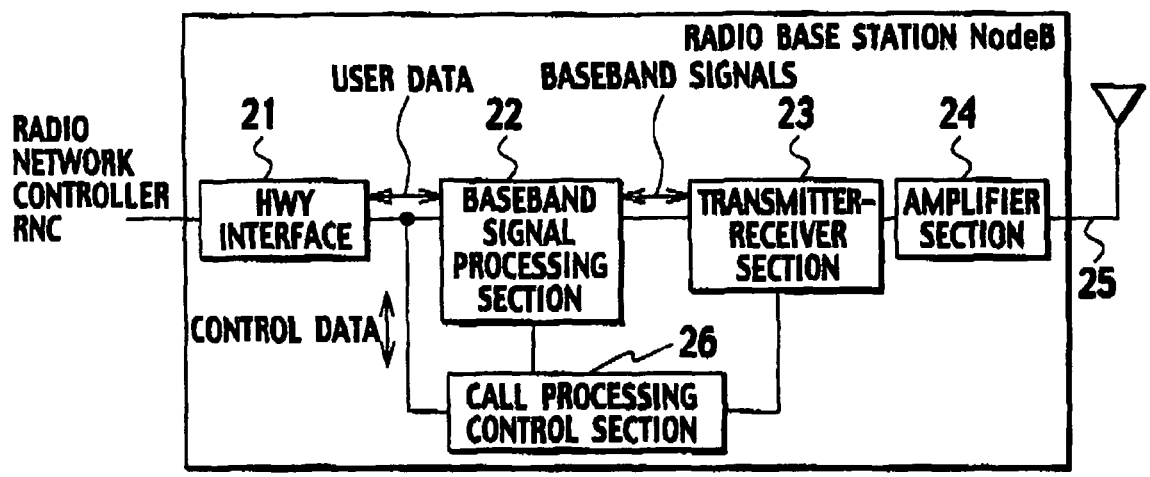
FIG. 11 is a functional block diagram of a radio base station according to the first embodiment of the present invention.

FIG. 11 shows an example of a configuration of functional blocks of a radio base station Node B according to this embodiment.

As shown in FIG. 11, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 12:
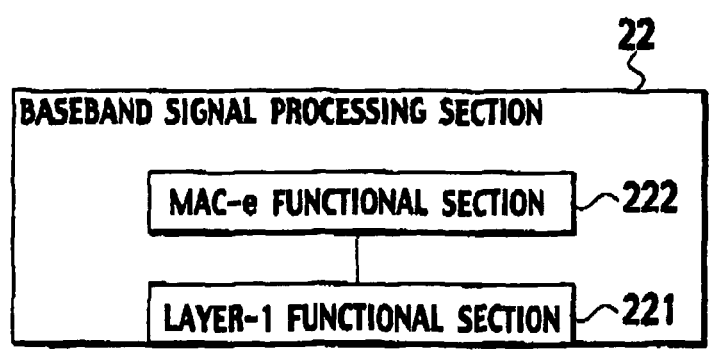
FIG. 12 is a functional block diagram of a baseband signal processing section in the radio base station of the mobile communication system according to the first embodiment of the present invention.

FIG. 12 is a functional block diagram of the baseband signal processing section 22.

As shown in FIG. 12, the baseband signal processing section 22 is provided with a layer-1 functional section 221, and a MAC-e functional section 222.

Figure 13:
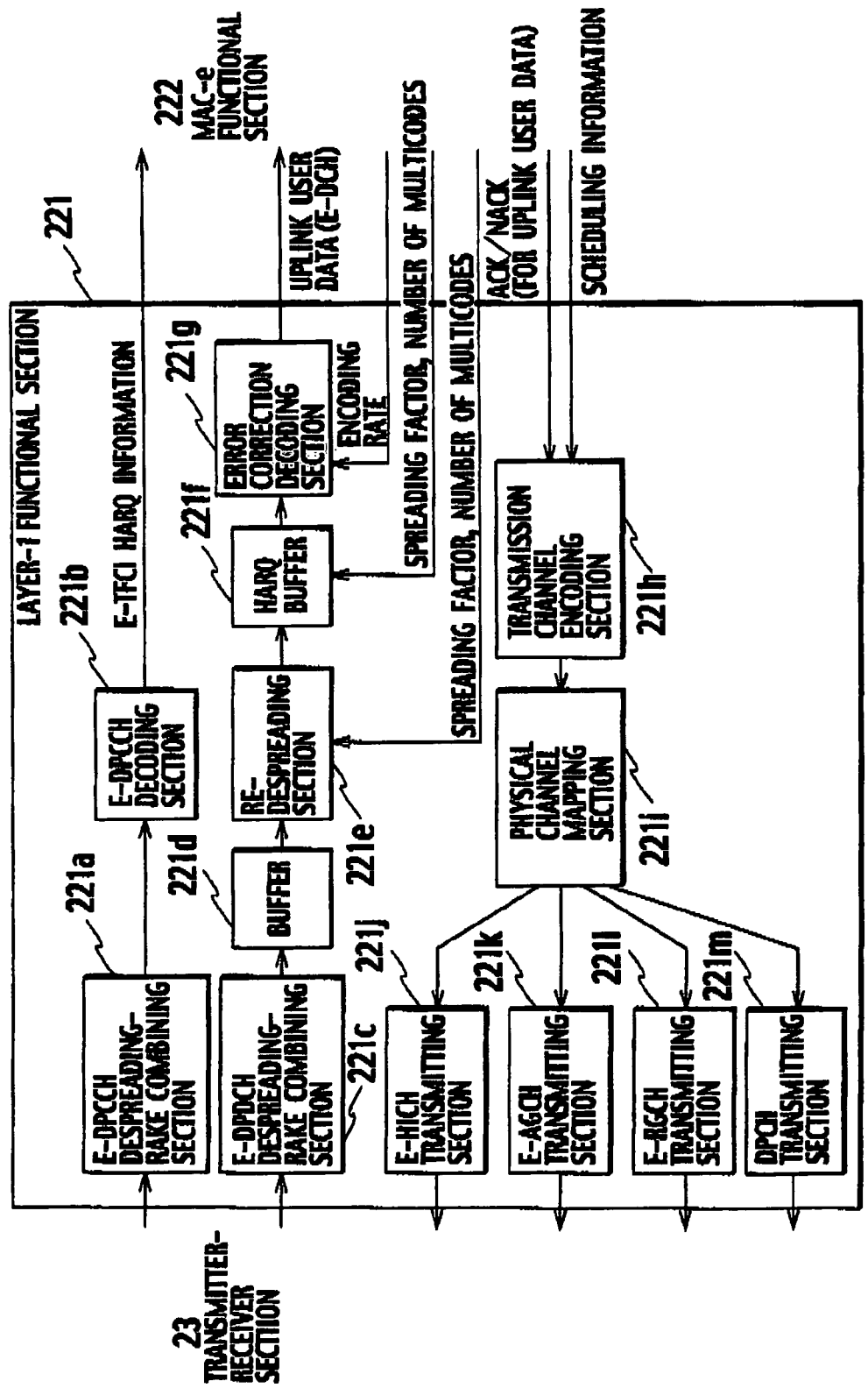
FIG. 13 is a functional block diagram of a layer-1 functional section in the baseband signal processing section in the radio base station of the mobile communication system according to the first embodiment of the present invention.

As shown in FIG. 13, the layer-1 functional section 221 is provided with an E-DPCCH despreading-RAKE combining section 221a, E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, an E-RGCH transmitting section 221l, and a DPCH transmitting section 221m.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221b is configured to decode the E-TFCI for determining the transmission rate of the uplink user data (or an "Enhanced Transport Format and Resource Indicator (E-TFRI)" based on the output from the E-DPCCH despreading-RAKE combining section 221a, so as to transmit the decoded E-TFCI to the MAC-e functional section 222.

The E-DPDCH despreading-RAKE combining section 221c is configured to perform the despreading processing to the E-DPDCH using the spreading factor (the minimum spreading factor) and the number of multi-codes which correspond to the maximum rate that the E-DPDCH can use, so as to store the despread data to the buffer 221d. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221e is configured to perform the re-despreading processing to the data stored in the buffer 221f using the spreading factor and the number of multi-codes which are notified from the MAC-e functional section 222, so as to store the re-despread data to the HARQ buffer 221f.

The error correction decoding section 221g is configured to perform the error correction decoding processing to the data stored in the buffer 221d based on the coding rate which is notified from the MAC-e functional section 222, so as to transmit the acquired "uplink user data (E-DCH)" to the MAC-e functional section 222.

The transmission channel encoding section 221h is configured to perform the necessary encoding processing to the ACK/NACK and the scheduling information for the uplink user data received from the MAC-e functional section 222.

The physical channel mapping section 221i is configured to pair the ACK/NACK for the uplink user data, which is acquired from the transmission channel encoding section 221h, with the E-HICH, to pair the scheduling information (absolute transmission rate), which is acquired from the transmission channel encoding section 221h, with the E-AGCH, and to pair the scheduling information (relative transmission rate), which is acquired from the transmission channel encoding section 221h, with the E-RGCH.

The E-HICH transmitting section 221j is configured to perform a transmission processing of the E-HICH.

The E-AGCH transmitting section 221k is configured to perform a transmission processing to the E-AGCH.

The E-RGCH transmitting section 221l is configured to perform a transmission processing to the E-RGCH.

The DPCH transmitting section 221m is configured to perform a transmission processing to a downlink "Dedicated Physical Channel (DPCH)" transmitted from the radio base station Node B.

Figure 14:
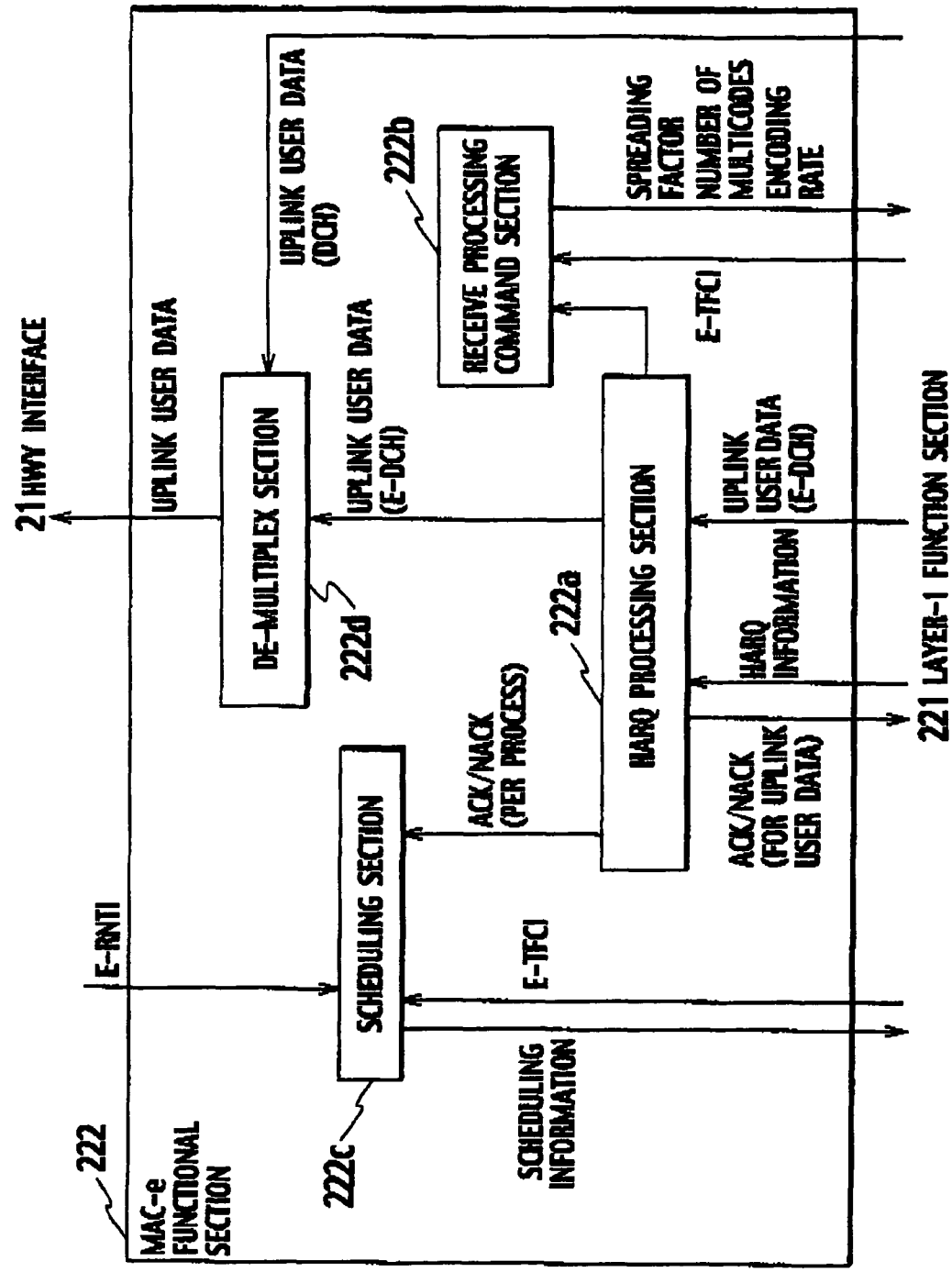
FIG. 14 is a functional block diagram of a MAC-e functional section in the baseband signal processing section in the radio base station of the communication system according to the first embodiment of the present invention.

As shown in FIG. 14, the MAC-e functional section 222 is provided with an HARQ processing section 222a, a receive processing command section 222b, a scheduling section 222c, and a de-multiplex section 222d.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222a is configured to notify, to the scheduling section 222c, the ACK/NACK (for the uplink user data) per process.

The receive processing command section 222b is configured to notify, to the re-despreading section 221e and the HARQ buffer 221f, the spreading factor and the number of multi-codes for the transport format of each mobile station UE, which is specified by the E-TFCI per TTI received from the E-DPCCH decoding section 221b in the layer-1 functional section 221. Then, the receive processing command section 222b is configured to notify the encoding rate to the error correction decoding section 221g.

The scheduling section 222c is configured to change the absolute transmission rate or the relative transmission rate of the uplink user data, based on the E-TFCI per TTI received from the E-DPCCH decoding section 221b in the layer-1 functional section 221, the ACK/NACK per process received from the HARQ processing section 222a, the interference level, and the like.

In addition, the scheduling section 222c is configured to notify, to the layer-1 functional section 221, the absolute transmission rate or the relative transmission rate of the uplink user data, as the scheduling information.

In addition, the scheduling section 222c is configured to notify, to the layer-1 functional section 221, the dedicated absolute transmission rate of the uplink user data to be used in the dedicated transmission rate control or the common absolute transmission rate of the uplink user data to be used in the common transmission rate control.

In addition, the scheduling section 222c is configured to control the transmission rate of uplink user data of the mobile station UE, by using the temporary identifier (the first temporary identifier or the second temporary identifier) which is the common identifier used in the common transmission rate control for the mobile station UE.

To be more specific, the scheduling section 222c is configured to determine to transmit the common absolute transmission rate for the mobile station UE during the SHO state, via the Common E-AGCH including the first temporary identifier.

In addition, the scheduling section 222c is configured to determine to transmit the common absolute transmission rate for the mobile station UE during the Non-SHO state, via the Common E-AGCH including the second temporary identifier.

The de-multiplex section 222d is configured to perform the de-multiplex processing to the "uplink user data (E-DCH)" received from the HARQ processing section 222a, so as to transmit the acquired uplink user data to the HWY interface 21.

The radio network controller RNC according to this embodiment is an apparatus located in an upper level of the radio base station Node B, and is configured to control radio communications between the radio base station Node B and the mobile station UE.

Figure 15:
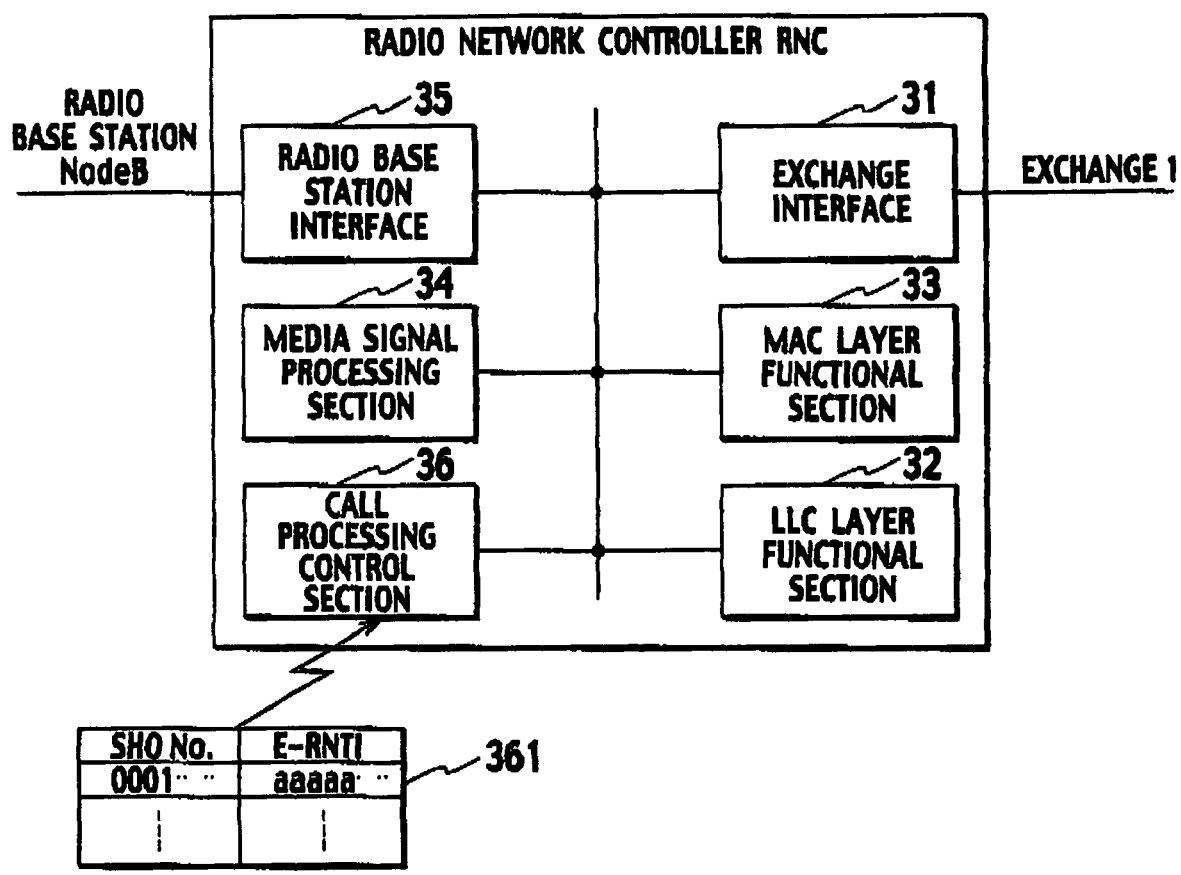
FIG. 15 is a functional block diagram of a radio network controller of the mobile communication system according to the first embodiment of the present invention.

As shown in FIG. 15, the radio network controller RNC according to this embodiment is provided with an exchange interface 31, a Logical Link Control (LLC) layer functional section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, as shown in FIG. 15, the call processing control section 36 is configured to control the first temporary identifier and the second temporary identifier.

The first temporary identifier should be allocated to the mobile station UE which is during the SHO state in which radio links between the mobile station UE and a plurality of cells are established.

The second temporary identifier should be allocated to the mobile station UE which is during the Non-SHO state, in which a radio link between the mobile station UE and only one cell is established.

In addition, the call processing control section 36 is configured to determine that the mobile station UE shifts between the SHO state and the Non-SHO state based on the above measurement report.

In addition, the call processing control section 36 is configured to allocate, to the mobile station UE, the first temporary identifier and the second temporary identifier as the common identifier in the common transmission rate control.

(Operations of Mobile Communication System According to First Embodiment of the Present Invention)

Figure 16:
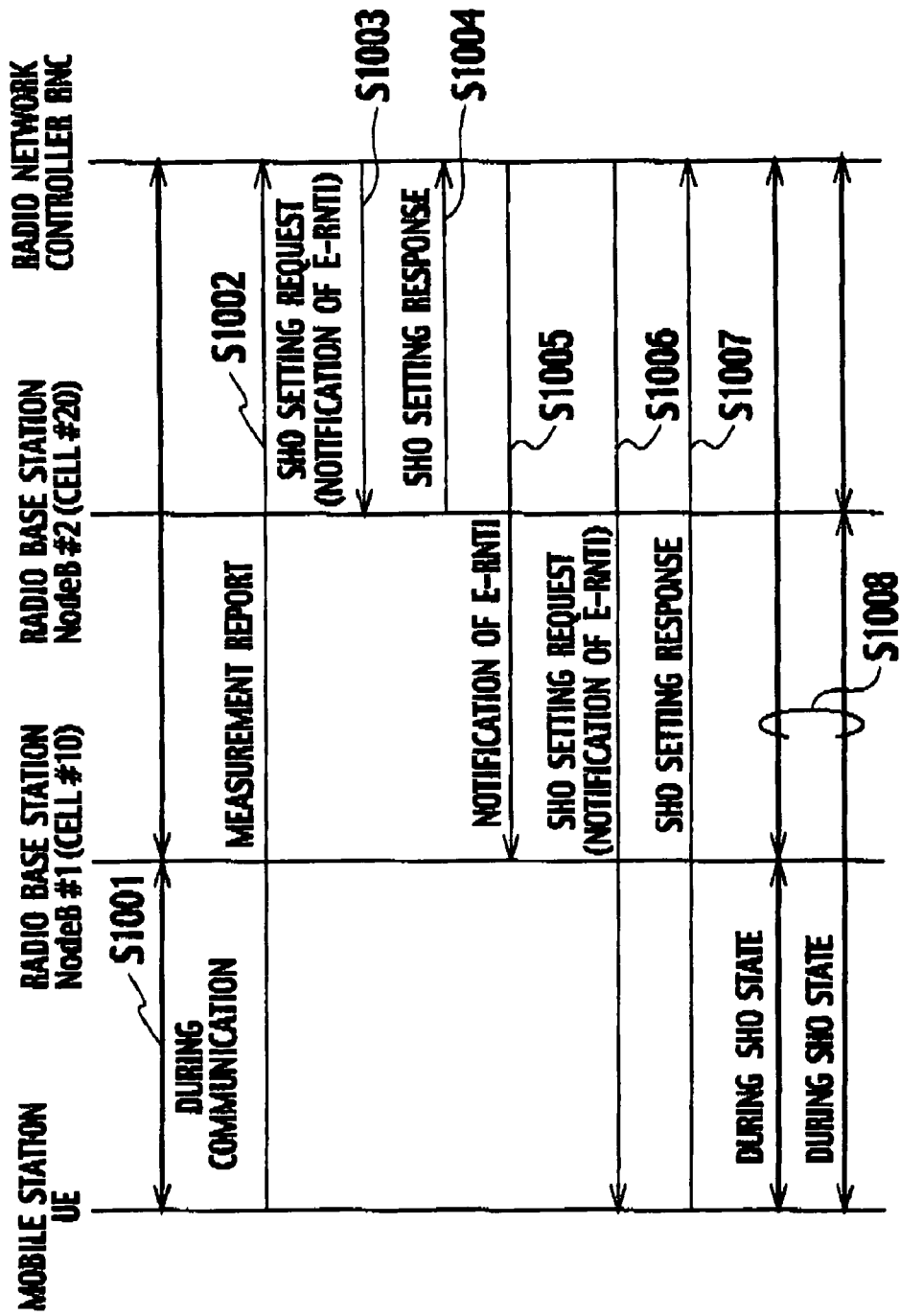
FIG. 16 is a sequence diagram showing operations of a transmission rate control method in the mobile communication system according to the first embodiment of the present invention.

Referring to FIG. 16, operations of a transmission power control method in the mobile communication system according to this embodiment will be described.

To be more specific, operations of controlling the transmission rate of uplink user data in the mobile communication system according to this embodiment will be described.

As shown in FIG. 16, in step S1001, the mobile station UE is establishing a data connection for transmitting the uplink user data with the radio network controller RNC via the cell #10.

In step S1002, when the reception power of the common pilot signal from the cell #20 become more than or equal to the predetermined value, the mobile station UE transmits a measurement report to the radio network controller RNC.

In step S1003, the radio network controller RNC determines that the mobile station UE shifts to the SHO state, where the radio links with the cell #10 as well as the cell #20 are established, based on the measurement report from the mobile station UE.

Then, the radio network controller RNC transmits, to the cell #20, a SHO setting request which requests to establish the synchronization of radio links for uplink as well as radio links for downlink between the cell #20 and the mobile station UE.

Here, the radio network controller RNC can be configured to allocate, to the mobile station UE, the first temporary identifier (E-DCH Radio Network Temporary Identity (E-RNTI)" as the common identifier in the common transmission rate control, and to notify the allocated first temporary identifier using the SHO setting request to the cell #20.

In step S1004, the cell #20 transmits a SHO setting response for indicating that the cell #20 has received the SHO setting request.

In step S1005, the radio network controller RNC notifies the allocated first temporary identifier to the cell #10.

In step S1006, the radio network controller RNC transmits, to the mobile station UE, a SHO setting request which requests to establish the synchronization of radio links for uplink as well as radio links for downlink between the cell #20 and the mobile station UE.

Here, the radio network controller RNC notifies the allocated first temporary identifier using the SHO setting request to the mobile station UE.

In step S1006, the mobile station UE transmits a SHO setting response for indicating that the mobile station UE has received the SHO setting request.

The mobile station UE shifts from the Non-SHO state to the SHO state based on the parameters. In step S1008, the mobile station in the SHO state with the cell #10 and the cell #20.

Here, the mobile station UE transmits the uplink user data to the cell #10 and the cell #20 using the first temporary identifier which is allocated in step S1003.

Then, the cell #10 (the serving cell) controls the transmission rate of the uplink user data of the mobile station UE using the temporary identifier (the first temporary identifier and the second temporary identifier) as the common identifier in the common transmission rate control.

(Effects of Mobile Communication System According to First Embodiment of the Present Invention)

As described above, according to the present invention, it is possible to provide a transmission rate control method which can increase radio uplink efficiency in whole cells by controlling a transmission rate of uplink user data of a mobile station UE during a soft-handover state, and a transmission rate of uplink user data of a mobile station UE during a non soft-handover state, differently, in a mobile communication system to which an "Enhanced Uplink" is applied, and a radio network controller RNC.

Additional advantages and modifications will readily occur to those skilled in the art Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling a transmission rate of uplink user data to be transmitted by a mobile station, comprising:

determining, at the radio network controller, that the mobile station should be shifted between a soft-handover state in which the mobile station establishes radio links with a plurality of cells and a non soft-handover state in which the mobile station establishes a radio link with only one cell;

allocating, at the radio network controller, a first temporary identifier or a second temporary identifier as a common identifier for a common transmission rate control to the mobile station based on the determination of shifts;

controlling, at a cell which establishes a radio link with the mobile station, the transmission rate of the uplink user data of the mobile station using the first temporary identifier or the second temporary identifier; and a radio network controller manages the first temporary identifier to be allocated to the mobile station during the soft-handover state, and the second temporary identifier to be allocated to the mobile station during the non soft-handover state, wherein the first temporary identifier used in the soft-handover is notified to the mobile station via a soft-handover setting request, wherein the common identifier is common to at least two mobile stations.

2. A radio network controller used in a mobile communication system for controlling a transmission rate of uplink user data transmitted by a mobile station, comprising:

a temporary identifier manager configured to manage a first temporary identifier and a second temporary identifier;

a shift determiner configured to determine that the mobile station should be shifted between a soft-handover state in which the mobile station establishes radio links with a plurality of cells and a non soft-handover state in which the mobile station establishes a radio link with only one cell; and a temporary identifier allocator configured to allocate the first temporary identifier or the second temporary identifier as a common identifier for a common transmission rate control to the mobile station, based on the determination of shifts, wherein the first temporary identifier used in the soft-handover is notified to the mobile station via a soft-handover setting request and the common identifier is common to at least two mobile stations.

3. The radio network controller according to claim 2, wherein the temporary identifier manager is configured to manage the first temporary identifier to be allocated to the mobile station during the soft-handover state, and the second temporary identifier to be allocated to the mobile station during the non soft-handover state.

* * * * *